(12) United States Patent
Longo

(10) Patent No.: US 6,745,950 B1
(45) Date of Patent: Jun. 8, 2004

(54) SCENT EMITTING SYSTEM

(76) Inventor: Phillip J. Longo, 8791 CR 614A, Bushnell, FL (US) 33513

(*) Notice: Subject to any disclaimer, the term of this patent is extended or adjusted under 35 U.S.C. 154(b) by 272 days.

(21) Appl. No.: 10/058,576

(22) Filed: Jan. 28, 2002

(51) Int. Cl.[7] ............................................... A24F 25/00
(52) U.S. Cl. ......................... 239/44; 239/145; 239/276
(58) Field of Search .......................... 239/44, 47, 145, 239/276; 473/581, 585, 577

(56) References Cited

U.S. PATENT DOCUMENTS

| | | | | |
|---|---|---|---|---|
| 3,701,533 A | * | 10/1972 | Palmer ........................ | 473/577 |
| 4,286,571 A | * | 9/1981 | Hung .......................... | 126/206 |
| 5,123,657 A | * | 6/1992 | Colt et al. ................... | 473/577 |
| 6,174,251 B1 | * | 1/2001 | Lemote ....................... | 473/581 |
| 6,202,938 B1 | * | 3/2001 | Collier ........................ | 239/34 |

* cited by examiner

Primary Examiner—Dinh Q. Nguyen
(74) Attorney, Agent, or Firm—Edward P. Dutkiewicz

(57) ABSTRACT

A scent emitting system comprises a shaft in a tubular configuration. The shaft has upper and lower ends. Both ends have female threads. An upper subassembly is provided. The subassembly has a disc-shaped central component and a downwardly projecting cap. The cap has an upper region. The upper region is formed with male threads threadedly couplable with the female threads at the upper end of the shaft. A wick is provided. The wick is slidably positionable within the shaft and has a central core. The central core has outwardly projecting bristles. The wick has an upper end coupled to the cap. Further provided is a closure assembly. The closure assembly has an upper extent. The upper extent is in a cylindrical configuration and has male threads. The male threads are threadedly couplable with the female threads at the lower end of the shaft.

6 Claims, 8 Drawing Sheets

SCENT EMITTING SYSTEM

BACKGROUND OF THE INVENTION

1. Field of the Invention

The present invention relates to a scent emitting system and more particularly pertains to allowing the dispersal of a scent to attract animals in a safe and convenient manner.

2. Description of the Prior Art

The use of scent emitting devices of known designs and configurations is known in the prior art. More specifically, scent emitting devices of known designs and configurations previously devised and utilized for the purpose of dispersing scents through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, note:

| U.S. Pat. Documents | | | |
| --- | --- | --- | --- |
| D228,911 | October 1973 | Gatter | |
| D268,695 | April 1983 | Kolf | |
| D301912 | June 1989 | Ward | |
| 2,738,224 | March 1956 | Turner et al. | 239/57 |
| 2,763,395 | September 1956 | Meek | 239/58 |
| 3,046,192 | July 1962 | Bilyeu | |
| 3,515,302 | June 1970 | Curran | 239/57 |
| 3,667,785 | June 1972 | Kapeker | 285/921 |
| 3,770,199 | November 1973 | Hoek et al. | 239/54 |
| 4,523,870 | June 1985 | Spector | 239/55 |
| 5,161,646 | November 1992 | Aurich et al. | |
| 5,263,274 | November 1993 | Speed | |
| 5,307,584 | May 1994 | Jarvis | |
| 5,465,521 | November 1995 | Baker et al. | |
| 5,544,812 | August 1996 | Torres | |
| 5,622,314 | April 1997 | Eason | |
| 5,746,019 | May 1998 | Fisher | |
| 5,832,648 | November 1998 | Malone | |
| 6,241,161 | Jun. 5, 2001 | Corbett | |
| Foreign Patent Documents | | | |
| 0 294 175 | December 1988 | | EP |
| 744369 | February 1956 | | GB |
| 2 251 601 | July 1992 | | GB |
| WO 90/07430 | July 1990 | | WO |

In recent years cover-up and attractant scents have been developed and perfected. Many hunters use both attractant or cover-up scents depending on their particular situation. However, there are few devices that are compact, durable and easy to use. There are wicks you dip and hang, very messy. There are bottles with wicks you pull out then roll back into the bottle, takes time. Neither of these devices allow the user to insert the device into the ground. Bow hunters particularly need to use scent as they require to get close to their game. Many hunters also would like to own a scent emitting device which is compact, easily transportable, and adaptable to be attached to a variety of structures, to be inserted into the ground or attached to their bow, etc. However, most scent emitting devices may not be compact and easily transportable, nor adaptable to be inserted into the ground. A scent emitting device which is both compact and versatile would therefore be desirable. A scent emitting device which is easily transportable and adaptable to be inserted into the ground or attach to a bow quiver would further be desirable. The present invention achieves these goals through a compact, durable, telescopic scent emitting device with a wick and uniquely designed hang-on device.

Various forms of scent dispensing devices are known. U.S. Design Pat. No. 228,911 issued on Oct. 30, 1973, to Adelaide L. Gatter describes an insect repellant container or similar article in the shape of a four-sided elongated rectangular box with a plurality of openings along at least two of the sides. U.S. Design Pat. No. 268,695 issued on Apr. 19, 1983, to John W. Kolf describes a deer scent dispenser with two flat surfaces with a scented fluffy material in front and two apertures for attachment by a strap. U.S. Design Pat. No. 301,912 issued on Jun. 27, 1989, to Lynwood W. Ward describes a deer scent holder in the shape of a capped tube with the cap having an aperture for attachment to a strap. U.S. Pat. No. 3,046,192 issued on Jul. 24, 1962, to Archie E. Bilyeu describes heated compositions of scents contained in an open fuel case covered by a cloth cover for attracting wild game and the method for their use by heating. U.S. Pat. No. 5,161,646 issued on Nov. 10, 1992, to Charles C. Aurich, et al. describes a device for dispensing animal attractant scents having a case in which are housed a power source and a bottle containing a supply of liquid animal attractant scent. The power source heats a wick containing a heat generating resistor. U.S. Pat. No. 5,263,274 issued on Nov. 23, 1993, to Kenneth D. Speed describes a game luring scent diffusing device that includes a supply container and a collection container suspended from the supply container by an elongated porous wick extending between the containers. U.S. Pat. No. 5,307,584 issued on May 3, 1994, to Robert Jarvis describes a deer scent dispenser comprising a cylindrical container that is provided with a bottom reservoir for liquid deer scent. The container has plastic screen walls which contain a wick.

U.S. Pat. No. 5,465,521 issued on Nov. 14, 1995, to Jeffrey L. Baker et al. describes a device including a plurality of scent cartridges stored within a container sealed by a cap. The cap includes a depending hook for extracting an individual scent cartridge from the container. U.S. Pat. No. 5,622,314 issued on Apr. 22, 1997, to Donald J. Eason describes a game scent diffusion device in the shape of an inverted T-shaped member adapted to be disposed in a bottle of liquid game scent and exposed when the bottle is hung from a tree. U.S. Pat. No. 5,746,019 issued on May 5, 1998, to Jeffrey J. Fisher describes a hunter's scenting system having a frangible vial containing scented liquid disposed within a flexible sheath member and having a wick member with a first end disposed adjacent to the vial and a second end extending below the sheath member. U.S. Pat. No. 5,832,648 issued on Nov. 10, 1998, to Richard E. Malone describes a jar-like container having a scented liquid therein and a ringed cap with an attachment of a plurality of elongated members that are configured to retain the container thereon when the cap is removed from the opening of the container. This arrangement permits the container to be suspended below the cap and a wick that is also attached to the cap to be in communication with air currents flowing over the wick.

United Kingdom Patent No. 744,369 published on Feb. 8, 1956, for Hugh W. B. Baker describes vaporizing attachments for bottles or like containers for liquids. Each attachment comprises a cap for the bottle and a wick support attachable to the cap so that the cap can be detached from the bottle and lifted to raise and expose a desired portion of the wick, whereby the liquid contents of the bottle can be vaporized. United Kingdom Patent No. 2,251,601 published on Jul. 15, 1992, for George M. Mowbray describes a disposable scent holder for an automobile window comprising two sheets of transparent plastic material sealed together to define a volume for scent. European Patent No. 294,175 published on Dec. 7, 1988 for John M. Cook describes a plate-like carrier having a surface to which a hollow tube containing a scent package can be affixed, and with the longitudinal axis of the tube being substantially parallel to the surface of the carrier. PCT Patent No. WO 90/07430, published on Jul. 12, 1990, for Aubrey W. Richardson describes a dispenser for dispensing a liquid including an elongated case having a body and a cap which includes a clip for carrying the dispenser in a shirt pocket. The case includes a reservoir for holding cologne or the like and a roller-ball applicator.

While these devices fulfill their respective, particular objectives and requirements, the aforementioned patents do not describe a scent emitting system that allows allowing the dispersal of a scent to attract animals in a safe and convenient manner.

In this respect, the scent emitting system according to the present invention substantially departs from the conventional concepts and designs of the prior art, and in doing so provides an apparatus primarily developed for the purpose of allowing the dispersal of a scent to attract animals in a safe and convenient manner.

Therefore, it can be appreciated that there exists a continuing need for a new and improved scent emitting system which can be used for allowing the dispersal of a scent to attract animals in a safe and convenient manner. In this regard, the present invention substantially fulfills this need.

SUMMARY OF THE INVENTION

In view of the foregoing disadvantages inherent in the known types of scent emitting devices of known designs and configurations now present in the prior art, the present invention provides an improved scent emitting system. As such, the general purpose of the present invention, which will be described subsequently in greater detail, is to provide a new and improved scent emitting system and method which has all the advantages of the prior art and none of the disadvantages.

To attain this, the present invention essentially comprises a shaft. The shaft is fabricated of an essentially rigid material. The shaft is in a tubular configuration. The shaft further has a cylindrical exterior surface of a first diameter and a cylindrical interior surface of a second diameter. These surfaces define a chamber within the shaft. The shaft has an open upper end and an open lower end. Both ends have female threads. Provided next is an upper hang-on subassembly. The hang-on subassembly is fabricated of an essentially rigid material. The hang-on subassembly has a disc-shaped central component. The central component has a top and a bottom. The central component further has an exterior diameter. The exterior diameter is essentially equal to the diameter of the cylindrical exterior surface of the shaft. The hang-on subassembly includes a plurality of upwardly projecting hanging hooks. The hanging hooks are in a generally arcuate configuration. Each of the hooks has a free top end and a bottom end formed integrally with the top of the central component. The hang-on subassembly also includes a downwardly projecting cap. The cap has an upper region. The upper region is formed with male threads. The male threads are threadedly couplable with the female threads at the upper end of the shaft. The cap has a lower region. The lower region is positionable within the chamber of the shaft and formed with a hole therethrough. An upper o-ring is provided. The o-ring is fabricated of an elastomeric material. The o-ring is further positioned between the central component and the upper end of the shaft when threadedly coupled together. In this manner a seal is created. Next provided is a wick. The wick has a linear brush-like configuration. The length of the wick is slightly less than that of the shaft. The wick is slidably positionable within the shaft. The wick has central core of twisted wire. The wick outwardly projects bristles of a plastic material. The plastic material has limited flexibility. The bristles have interior ends and exterior ends. The interior ends are supported by the wire. The exterior ends are in a cylindrical configuration at a diameter slightly greater than that of the interior surface of the shaft. Contact between the bristles and the housing will cause the wick to stay in the position as last placed by a user. The wire has an upper end forming a loop coupled to the hole in the cap. A lower closure assembly is provided next. The lower closure assembly is fabricated of an essentially rigid materia. The lower closure assembly has a middle extent. The middle extent is in a solid disc-like configuration. The middle extent has an exterior diameter essentially equal to that of the cylindrical exterior surface of the shaft. The closure assembly has an upper extent. The upper extent is in a cylindrical configuration. The upper extent further has male threads. The male threads are threadedly couplable with the female threads at the lower end of the shaft. The closure assembly has a lower extent. The lower extent is in a generally cone-shaped configuration. The lower extent is further adapted to be penetrated into the ground during operation and use. The closure assembly is adapted to be uncoupled from the shaft for the addition of scent to the bristles and adapted to be recoupled for operation and use. Provided next is a lower o-ring. The lower o-ring is fabricated of an elastomeric material. The lower o-ring is positioned between the closure assembly and the lower end of the shaft when threadedly coupled together. In this manner a seal is created during operation and use. Further provided is an alternate closure assembly. The alternate closure assembly has a central cylinder. The central cylinder has an upper end and a lower end. The central cylinder further has a laterally extending side projection. The side projection has a cylindrical configuration. The side projection further has a tapered screw-threaded tip for mounting into a tree trunk by screwing the threaded tip into a tree trunk. Each end of the central cylinder has a cylindrical extension with male threads. The male threads are threadedly couplable with the female threads at the lower end of the shaft. Provided last is a bow hunter's quiver. The bow hunter's quiver has a plurality of generally parallel slots. Each slot terminates in an enlarged interior aperture. The aperture is of a size to receive and frictionally support a plurality of shafts.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved scent emitting system which has all of the advantages of the prior art scent emitting devices of known designs and configurations and none of the disadvantages.

It is another object of the present invention to provide a new and improved scent emitting system which may be easily and efficiently manufactured and marketed.

It is further an object of the present invention to provide a new and improved scent emitting system which is of durable and reliable constructions.

An even further object of the present invention is to provide a new and improved scent emitting system which is susceptible of a low cost of manufacture with regard to both materials and labor, and which accordingly is then susceptible of low prices of sale to the consuming public, thereby making such scent emitting system economically available to the buying public.

Even still another object of the present invention is to provide a scent emitting system for allowing the dispersal of a scent to attract animals in a safe and convenient manner.

Lastly, it is an object of the present invention to provide a new and improved scent emitting system comprises a shaft in a tubular configuration. The shaft has upper and lower ends. Both ends have female threads. An upper subassembly is provided. The subassembly has a disc-shaped central component and a downwardly projecting cap. The cap has an upper region. The upper region is formed with male threads threadedly couplable with the female threads at the upper end of the shaft. A wick is provided. The wick is slidably positionable within the shaft and has a central core. The central core has outwardly projecting bristles. The wick has an upper end coupled to the cap. Further provided is a closure assembly. The closure assembly has an upper extent. The upper extent is in a cylindrical configuration and has male threads. The male threads are threadedly couplable with the female threads at the lower end of the shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
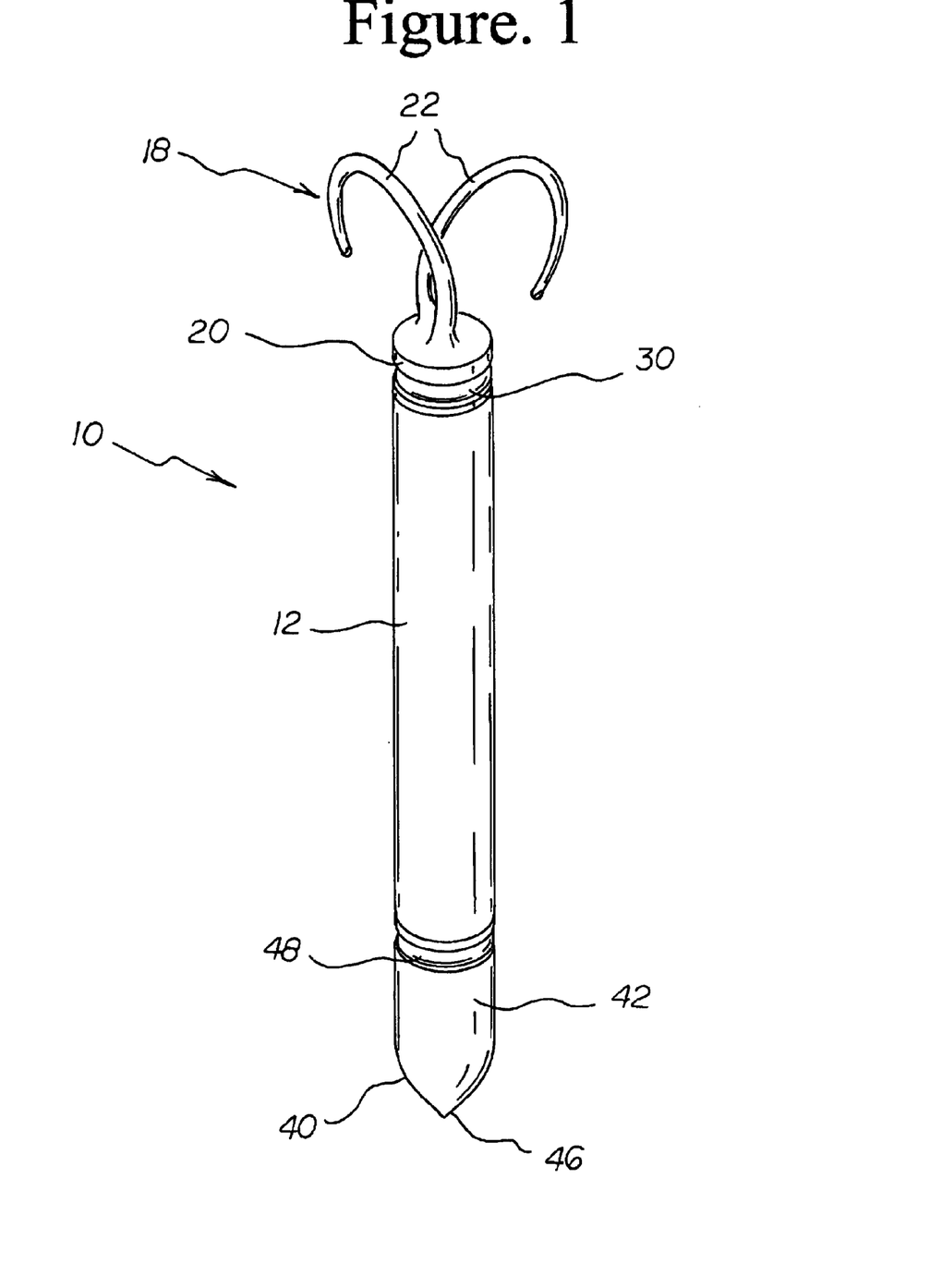
FIG. 1 is perspective view of a scent emitting system constructed in accordance with the principles of the present invention.

With reference now to the drawings, and in particular to FIG. 1 thereof, the preferred embodiment of the new and improved scent emitting system embodying the principles and concepts of the present invention and generally designated by the reference numeral 10 will be described.

The present invention, the scent emitting system 10 is comprised of a plurality of components. Such components in their broadest context include a shaft, an upper subassembly, a wick, and a closure assembly. Such components are individually configured and correlated with respect to each other so as to attain the desired objective.

First provided is a shaft 12. The shaft is fabricated of an essentially rigid material. The shaft is in a tubular configuration. The shaft further has a cylindrical exterior surface of a first diameter and a cylindrical interior surface of a second diameter. These surfaces define a chamber within the shaft. The shaft has an open upper end 14 and an open lower end 16. Both ends have female threads.

Figure 4:
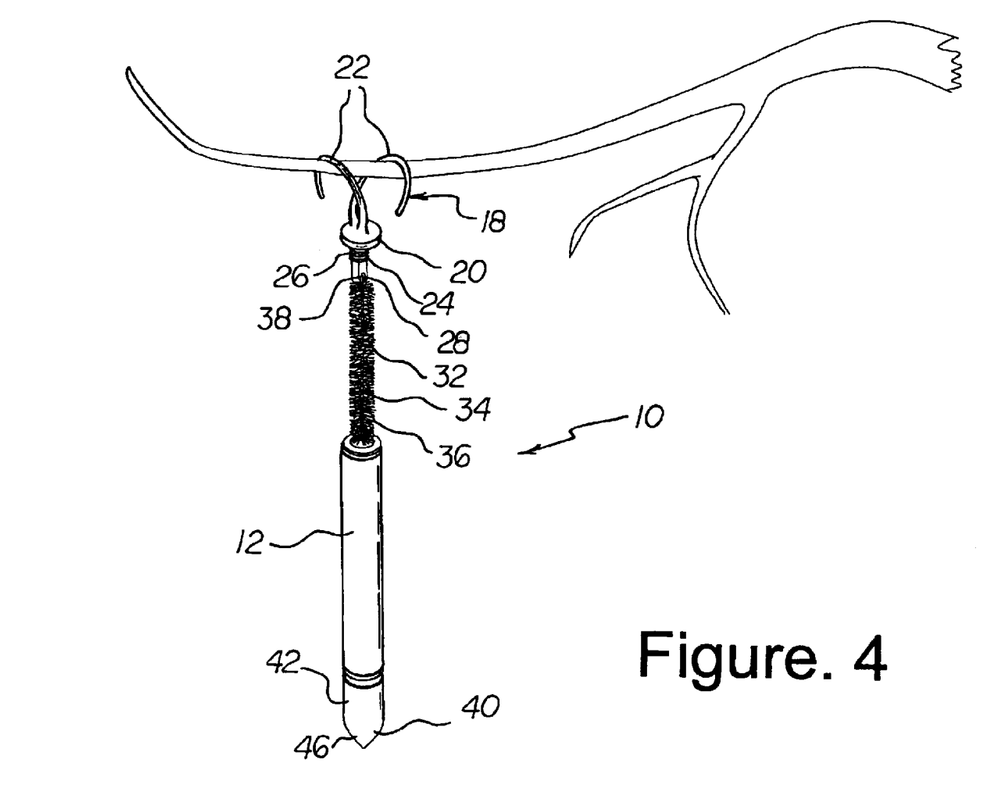
FIG. 4 is a perspective view similar to the prior figures demonstrating the application of the hanging hooks engaged with a tree limb.

Provided next is an upper hang-on subassembly 18. The hang-on subassembly is fabricated of an essentially rigid material. The hang-on subassembly has a disc-shaped central component 20. The central component has a top and a bottom. The central component further has an exterior diameter. The exterior diameter is essentially equal to the diameter of the cylindrical exterior surface of the shaft. The hang-on subassembly includes a plurality of upwardly projecting hanging hooks 22. The hanging hooks are in a generally arcuate configuration. Each of the hooks has a free top end and a bottom end formed integrally with the top of the central component. The hang-on subassembly also includes a downwardly projecting cap 24. The cap has an upper region. The upper region is formed with male threads 26. The male threads are threadedly couplable with the female threads at the upper end of the shaft. The cap has a lower region. The lower region is positionable within the chamber of the shaft and formed with a hole 28 therethrough.

An upper o-ring 30 is provided. The o-ring is fabricated of an elastomeric material. The o-ring is further positioned between the central component and the upper end of the shaft when threadedly coupled together. In this manner a seal is created.

Figure 2:
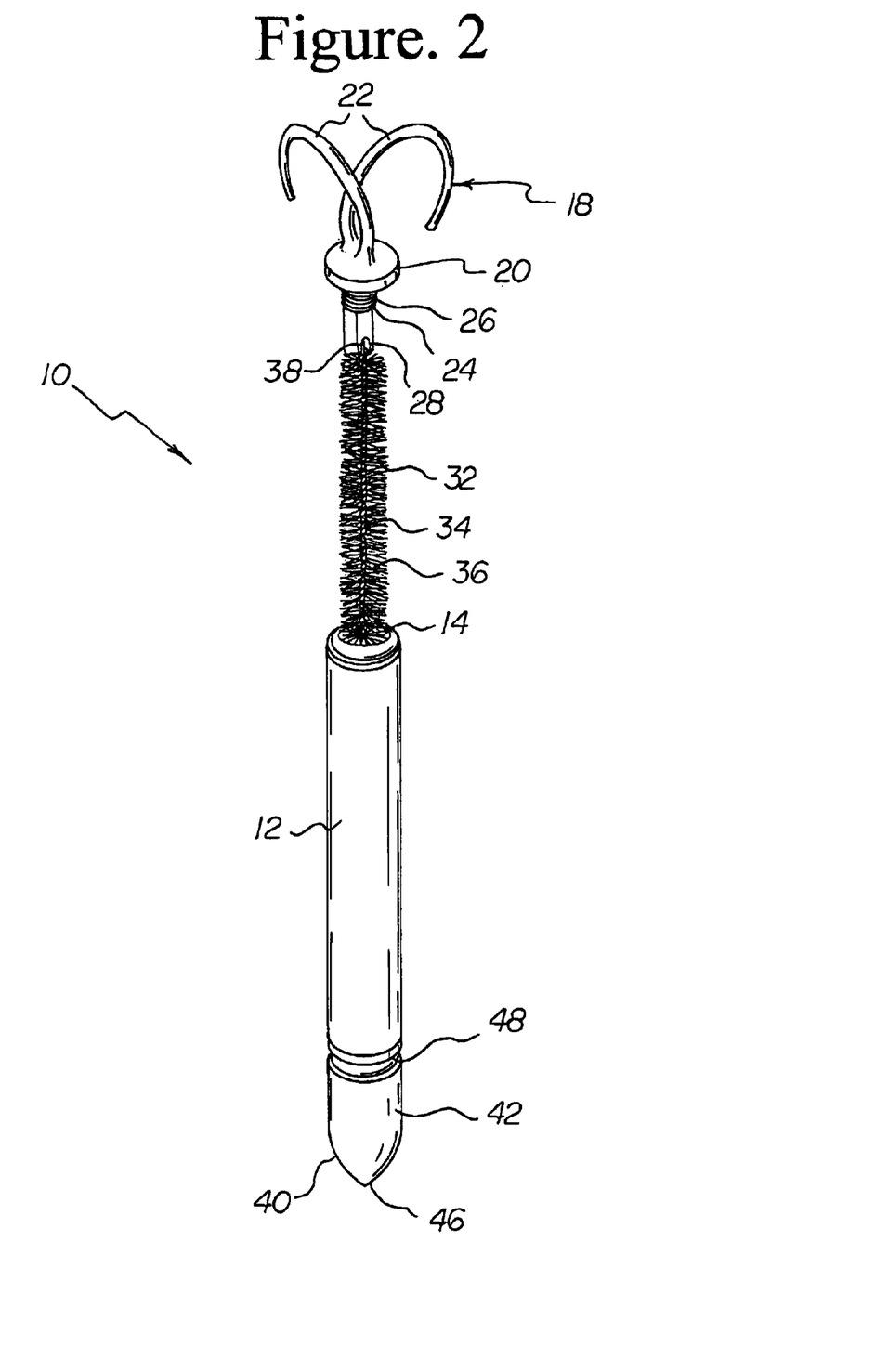
FIG. 2 is a perspective view similar to FIG. 1 but partially opened for operation and use.

Next provided is a wick 32. The wick has a linear brush-like configuration. The length of the wick is slightly less than that of the shaft. The wick is slidably positionable within the shaft. The wick has central core 34 of twisted wire. The wick outwardly projects bristles 36 of a plastic material. The plastic material has limited flexibility. The bristles have interior ends and exterior ends. The interior ends are supported by the wire. The exterior ends are in a cylindrical configuration at a diameter slightly greater than that of the interior surface of the shaft. Contact between the bristles and the housing will cause the wick to stay in the position as last placed by a user. The wire has an upper end forming a loop 38 coupled to the hole in the cap.

Figure 6:
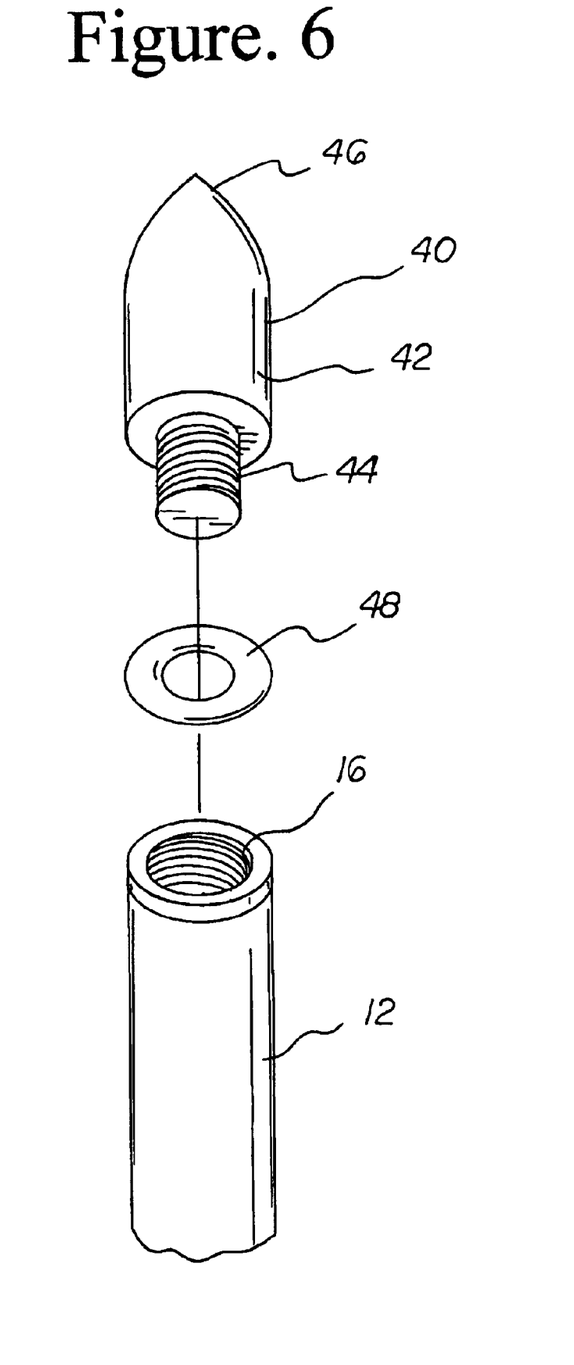
FIG. 6 is an exploded view of the lower closure assembly and the lower o-ring.

A lower closure assembly 40 is provided next. The lower closure assembly is fabricated of an essentially rigid materia. The lower closure assembly has a middle extent 42. The middle extent is in a solid disc-like configuration. The middle extent has an exterior diameter essentially equal to that of the cylindrical exterior surface of the shaft. The closure assembly has an upper extent 44. The upper extent is in a cylindrical configuration. The upper extent further has male threads. The male threads are threadedly couplable with the female threads at the lower end of the shaft. The closure assembly has a lower extent 46. The lower extent is in a generally cone-shaped configuration. The lower extent is further adapted to be penetrated into the ground during operation and use. The closure assembly is adapted to be uncoupled from the shaft for the addition of scent to the bristles and adapted to be recoupled for operation and use.

Provided next is a lower o-ring 48. The lower o-ring is fabricated of an elastomeric material. The lower o-ring is positioned between the closure assembly and the lower end of the shaft when threadedly coupled together. In this manner a seal is created during operation and use.

Figure 7:
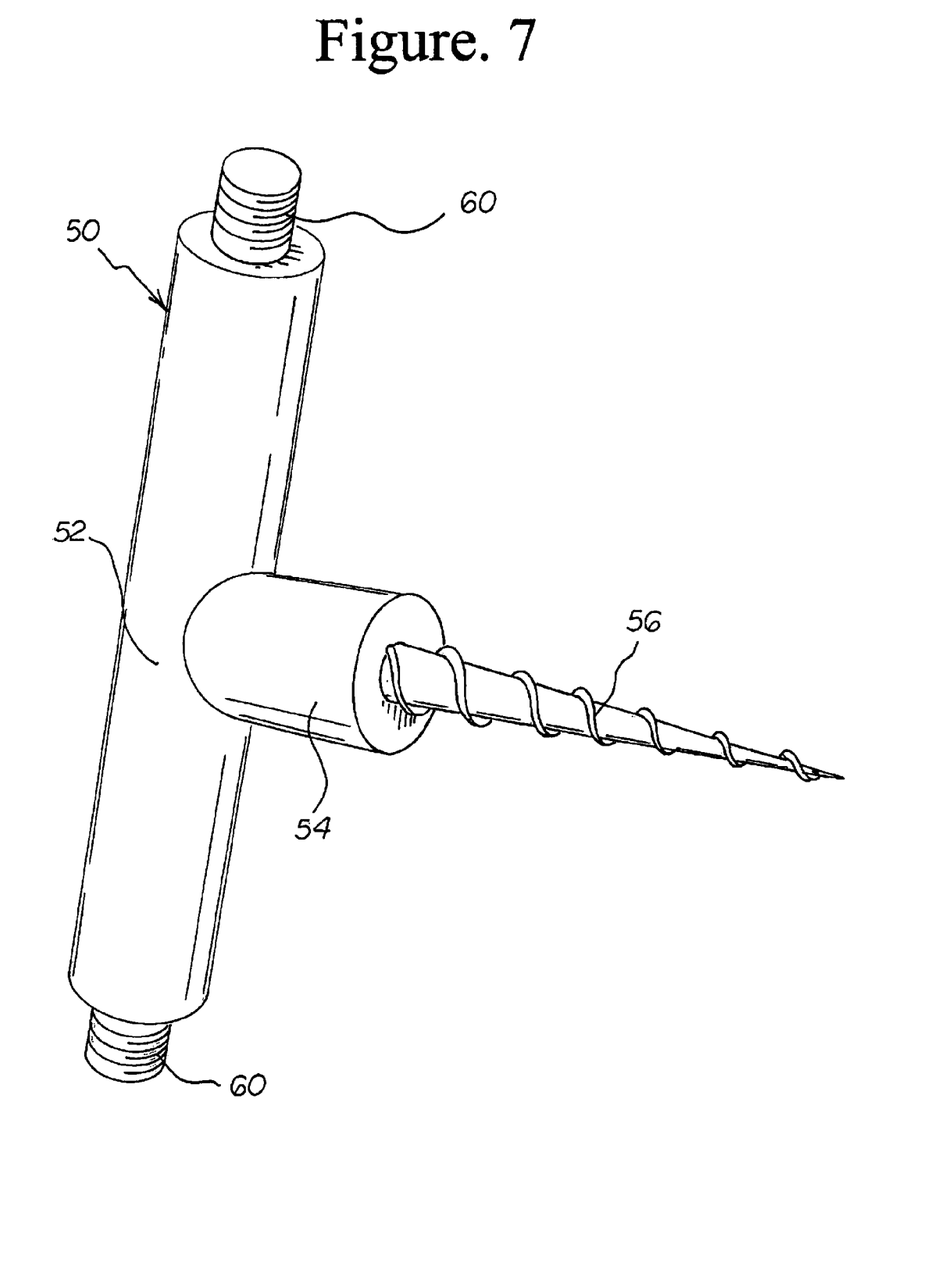
FIG. 7 is a perspective view of an alternative closure assembly having a thread to penetrate a tree trunk.
Figure 8:
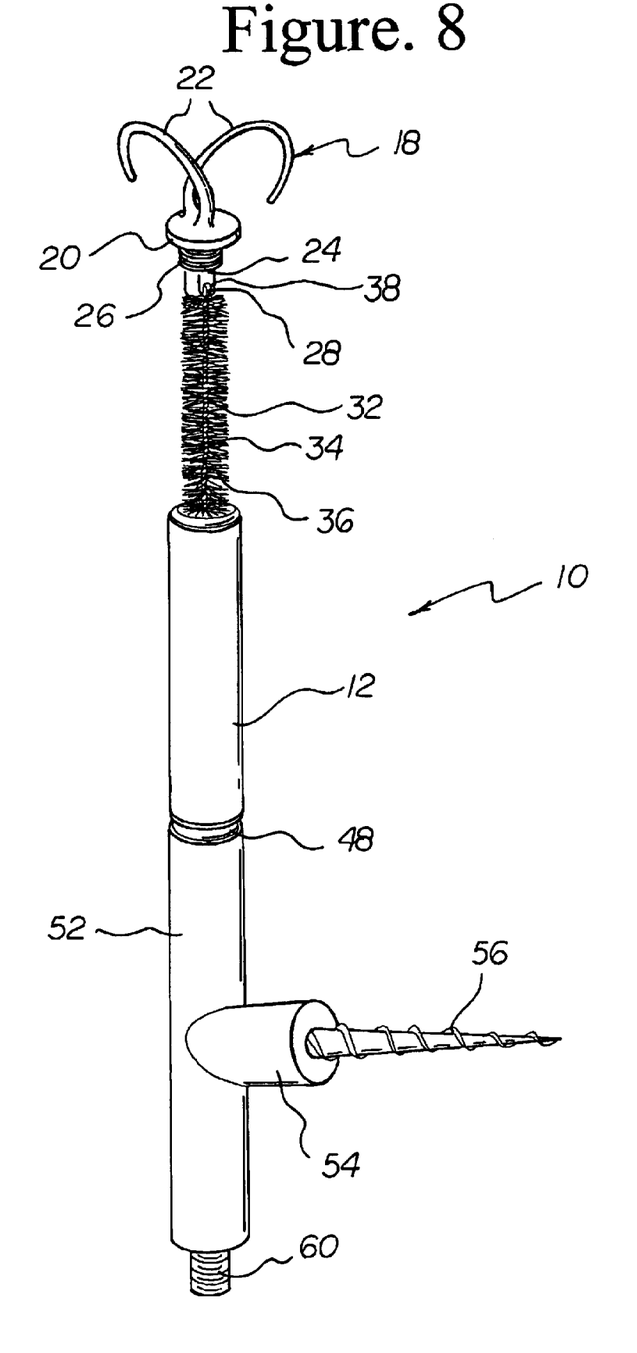
FIG. 8 is a perspective view similar to FIG. 7 but with the alternate closure assembly coupled to the system.

Further provided is an alternate closure assembly 50. The alternate closure assembly has a central cylinder 52. The central cylinder has an upper end and a lower end. The central cylinder further has a laterally extending side projection 54. The side projection has a cylindrical configuration. The side projection further has a tapered screw-threaded tip 56 for mounting into a tree trunk by screwing the threaded tip into a tree trunk. Each end of the central cylinder has a cylindrical extension 60 with male threads. The male threads are threadedly couplable with the female threads at the lower end of the shaft.

Figure 5:
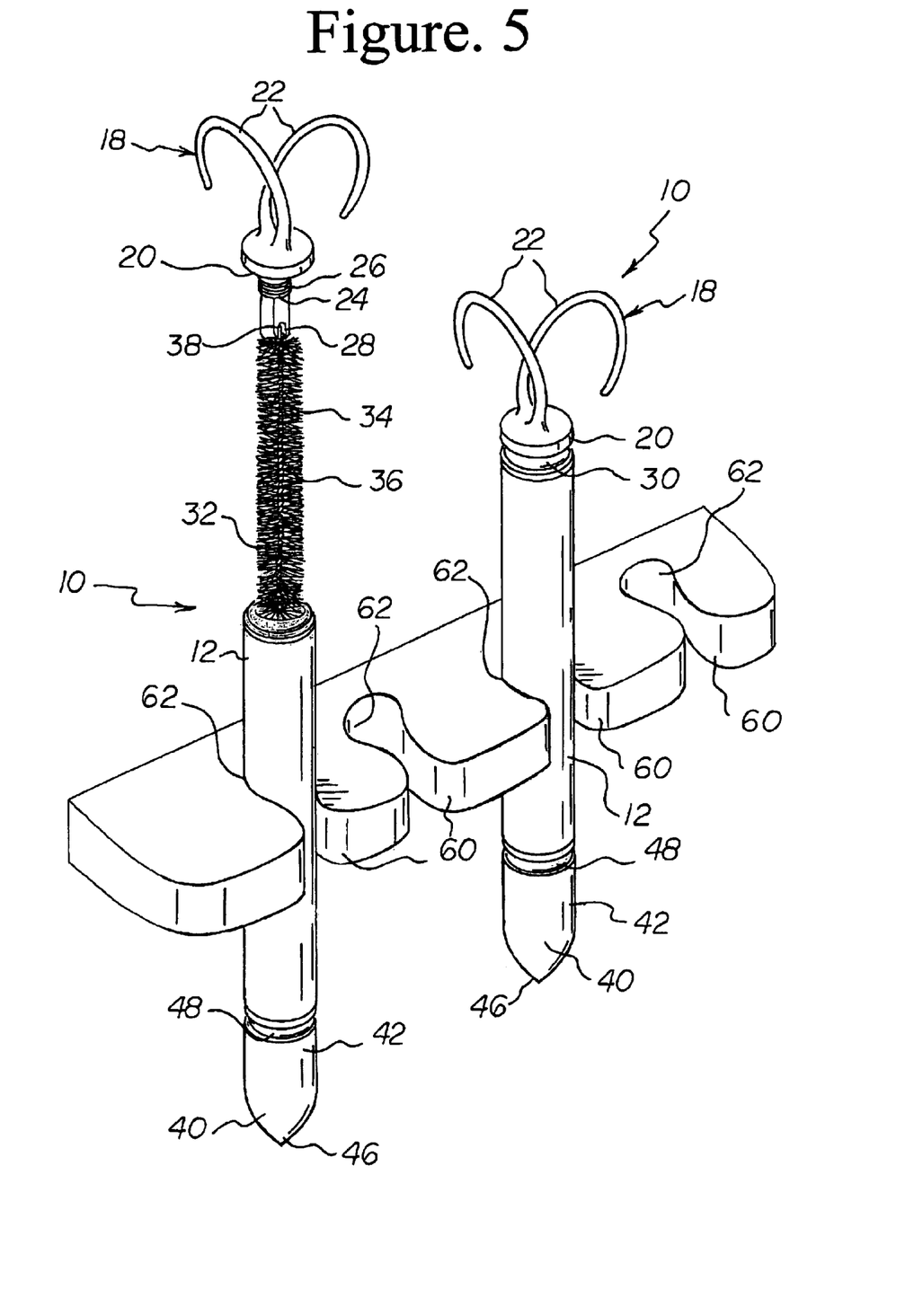
FIG. 5 is a perspective view of a plurality of devices carried in a bow quiver of a hunter, illustrating both the closed and open modes.

Provided last is a bow hunter's quiver 58. The bow hunter's quiver has a plurality of generally parallel slots 60. Each slot terminates in an enlarged interior aperture 62. The aperture is of a size to receive and frictionally support a plurality of shafts.

A preferred method of using the system 10, which is to be attached to an elevated type structure, natural of man made, is embodied in the following steps:

(a) saturating the bristles 36 for releasing a scent with a sufficient volume of the scented fluid;

(b) loading the bristles inverting shaft 12, removing the lower closure 40 to fill shaft 12 with scent.

(c) inserting the bristles 36 into the shaft 12 until all portions of the bristles 36 reside within the shaft 12;

(d) applying a sufficient torque upon the hang-on subassembly 18 in a clockwise direction until the system is placed in the closed position;

(e) transporting the system to a desired destination;

(f) partially inserting lower closure assembly of the system into the ground;

(g) applying a sufficient torque upon the hang-on subassembly in a counterclockwise direction until disengaged from the upper end 14 of the shaft 12;

(h) applying a sufficient pressure upon the hang-on subassembly in a counter-clockwise direction of the shaft 12 until the system is in the open position; and (i) pulling down with sufficient pressure upon shaft 12, exposing bristles 36.

Figure 3:
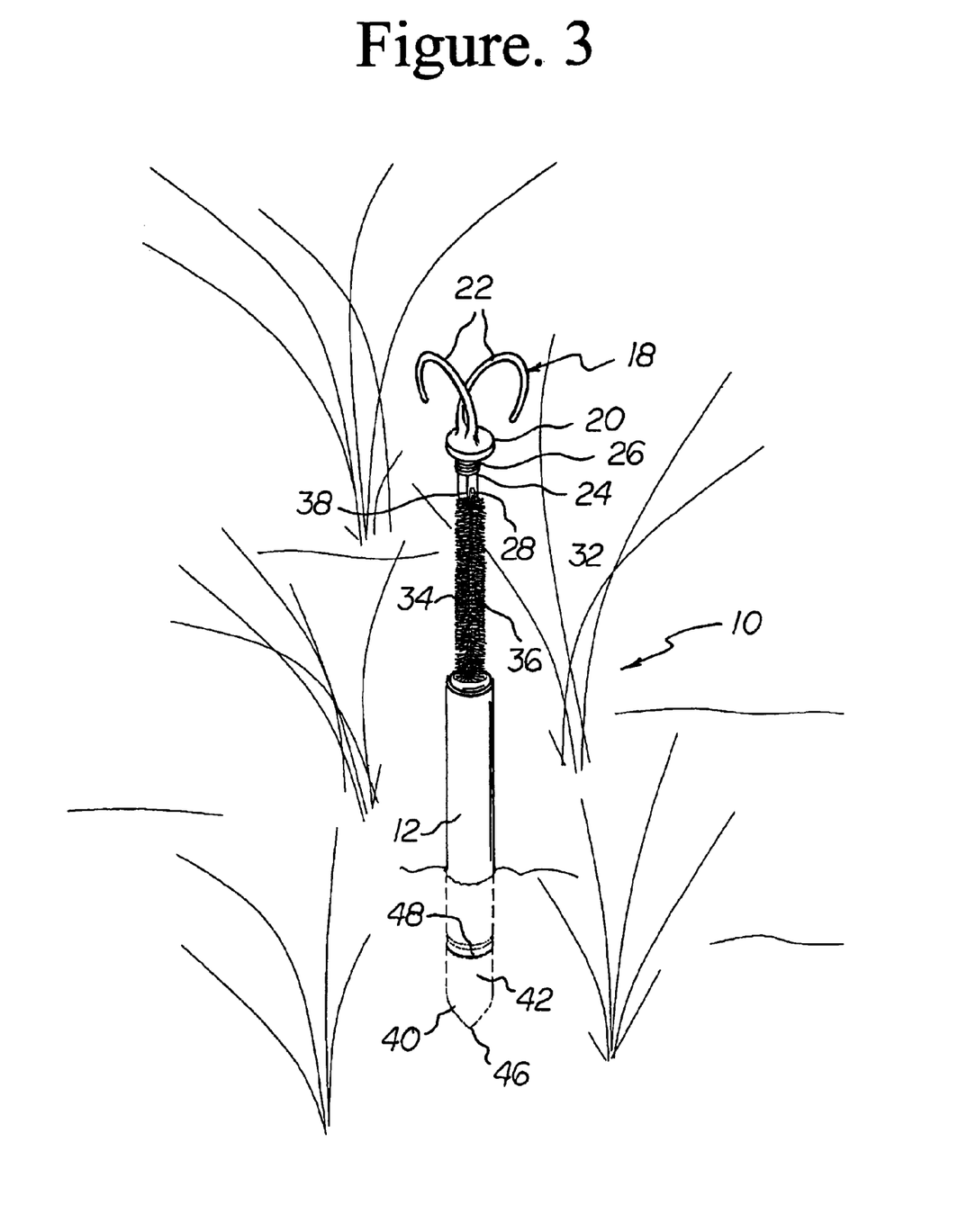
FIG. 3 is a perspective view similar to FIG. 2 demonstrating the application of the ground penetrating conical tip.

A preferred method of using the system 10, which is to be partially inserted into the ground, is embodied in the following steps:

(a) saturating the bristles 36 for releasing a scent with a sufficient volume of the scented fluid;

(b) loading the bristles, inverting shaft 12, removing lower closure 40 to fill shaft 12 with scent;

(c) inserting the bristles 36 into the shaft 12 until all portions of the bristles 36 reside within the shaft 12;

(d) applying a sufficient torque upon the hang-on subassembly 18 in a clockwise direction until the system 10 is placed in the closed position;

(e) transporting the system to a desired destination;

(f) partially inserting tip of the lower extent 46 of the system 10 into the ground;

(g) applying a sufficient torque upon the hang-on subassembly in a counterclockwise direction until disengaged from the first upper end 14 of the shaft 12;

(h) applying a sufficient pressure upon the hang-on subassembly 16 in a counter-clockwise direction of the shaft 12 until the system 10 is in the open position; and (i) pulling down with sufficient pressure upon shaft 12, exposing bristles 36.

A preferred method of using the system 10, when gun hunting, using a treestand with no appropriate structure from which to hang the system 10 is embodied in the following steps;

(a) saturating the bristles 36 for emitting a sufficient volume of the scented fluid;

(b) loading the bristles, inverting the shaft 12, removing the lower closure assembly 40 to fill shaft 12 with scent;

(c) inserting the bristles 36 into the shaft 12 until all portions of the bristles 36 reside within the shaft 12;

(d) applying a sufficient torque upon the hang-on subassembly 18 in a clockwise direction until the system 10 is placed in the closed position;

(e) transporting the system 10 to a desired destination;

(f) using the alternate closure assembly 50, using appropriate force, pressing screw into tree and turning in clockwise direction until seated with T perpendicular to the ground;

(g) inverting shaft 12, removing lower closure assembly 40, screwing shaft to lower threaded end of the alternate closure assembly 50;

(h) backing alternate closure assembly 40 one half turn, 180 degrees, until device is in upright position;

(i) applying a sufficient torque upon the hang-on subassembly 18 in a counter-clockwise direction until disengaged from the upper end 14 of the shaft 12;

(j) applying a sufficient pressure upon the hang-on subassembly 18 in a counter-clockwise direction of the shaft 12 until the system 10 is in the open position; and (k) pulling upward with sufficient pressure upons shaft 12, exposing bristles 36.

A preferred method of using the system 10, with bow hunting arrow quiver 58, is embodied in the following steps:

(a) saturating the bristles 36 for releasing a scent with a sufficient volume of the scented fluid;

(b) loading the bristles 36, inverting shaft 12, removing lower closure assembly to fill shaft 12 with scent;

(c) inserting the bristles 36 into the shaft 12 until all portions of the bristles 36 reside within the shaft 12;

(d) applying a sufficient torque upon the hang-on subassembly 18 in a clockwise direction until the system 10 is placed in the closed position;

(e) placing system(s) 10 in bow quiver 58 in upright position;

(f) transporting the system 10 to a desired destination;

(g) applying a sufficient torque upon the hang-on subassembly 18 in a counterclockwise direction until disengaged from the upper end 14 of the shaft 12;

(h) applying a sufficient pressure upon the hang-on subassembly 18 in a counter-clockwise direction of the shaft 12 until the system 10 is in the open position; and (i) pulling upward with sufficient pressure upon hang-on subassembly 18, exposing bristles 36.

The shaft 12 is preferably fabricated of a lightweight material that does not absorb the scented fluid. The scented fluid can be a natural product or a synthetic product. The bristles are self-supporting and made of synthetic fibers or filament like material. The invention is a compact, durable, transportable and telescopic scent emitting device for hunters, photographers and biologists. The invention is designed to be transported in a closed position. When in an extended position it will emit a scent for attracting game animals or for masking human scent.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scent emitting system for allowing the dispersal of a scent to attract animals in a safe and convenient manner comprising, in combination:

a shaft fabricated of an essentially rigid material in a tubular configuration with a cylindrical exterior surface of a first diameter and a cylindrical interior surface of a second diameter defining a chamber there within, the shaft having an open upper end with female threads and an open lower end with female threads;

an upper hang-on subassembly fabricated of an essentially rigid material having a disc-shaped central component with a top and a bottom and an exterior diameter essentially equal to the diameter of the cylindrical exterior surface of the shaft, the hang-on subassembly including a plurality of upwardly projecting hanging hooks in a generally arcuate configuration with each of the hooks having a free top end and a bottom end formed integrally with the top of the central component, the hang-on subassembly also including a downwardly projecting cap, the cap having an upper region formed with male threads threadedly couplable with the female threads at the upper end of the shaft, the cap having a lower region positionable within the chamber of the shaft and formed with a hole therethrough;

an upper o-ring fabricated of an elastomeric material positioned between the central component and the upper end of the shaft when threadedly coupled together to thereby create a seal;

a wick having a linear brush-like configuration with a length slightly less than the length of the shaft and slidably positionable within the shaft, the wick having central core of twisted wire with outwardly projecting bristles of a plastic material having limited flexibility, the bristles having interior ends supported by the wire and exterior ends in a cylindrical configuration at a diameter slightly greater than the diameter of interior surface of the shaft whereby contact between the bristles and the housing will cause the wick to stay in the position as last placed by a user, the wire having an upper end forming a loop coupled to the hole in the cap;

a lower closure assembly fabricated of an essentially rigid material having a middle extent in a solid disc-like configuration with an exterior diameter essentially equal to the diameter of the cylindrical exterior surface of the shaft, the closure assembly having an upper extent in a cylindrical configuration with male threads threadedly couplable with the female threads at the lower end of the shaft, the closure assembly having a lower extent in a generally cone-shaped configuration adapted to be penetrated into the ground during operation and use, the closure assembly adapted to be uncoupled from the shaft for the addition of scent to the bristles and adapted to be recoupled for operation and use;

a lower o-ring fabricated of an elastomeric material positioned between the closure assembly and the lower end of the shaft when threadedly coupled together to thereby create a seal during operation and use;

an alternate closure assembly with a central cylinder with an upper end and a lower end and a laterally extending side projection, the side projection having a cylindrical configuration with a tapered screw-threaded tip for mounting into a tree trunk by screwing the threaded tip into a tree trunk, each end of the central cylinder having a cylindrical extension 60 with male threads threadedly couplable with the female threads at the lower end of the shaft; and a bow hunter's quiver with a plurality of generally parallel slots each terminating in an enlarged interior aperture of a size to receive and frictionally support a plurality of shafts.

2. A scent emitting system comprising:

a shaft in a tubular configuration with an open upper end with female threads and an open lower end with female threads;

an upper subassembly having a disc-shaped central component and a downwardly projecting cap having an upper region formed with male threads threadedly couplable with the female threads at the upper end of the shaft;

a wick slidably positionable within the shaft and having central core with outwardly projecting bristles, the wick having an upper end coupled to the cap; and a closure assembly having an upper extent in a cylindrical configuration with male threads threadedly couplable with the female threads at the lower end of the shaft.

3. The system as set forth in claim 2 wherein the upper subassembly includes a disc-shaped central component with a top and a bottom and an exterior diameter essentially equal to the diameter of the cylindrical exterior surface of the shaft, the upper subassembly including a plurality of upwardly projecting hanging hooks in a generally arcuate configuration with each of the hooks having a free top end and a bottom end formed integrally with the top of the central component, the upper subassembly also including a downwardly projecting cap having an upper region formed with male threads threadedly couplable with the female threads at the upper end of the shaft, the cap having a lower region positionable within the chamber of the shaft.

4. The system as set forth in claim 2 wherein the lower assembly has a lower extent in a generally cone-shaped configuration adapted to be penetrated into the ground during operation and use.

5. The system as set forth in claim 2 wherein the lower assembly has a central cylinder with an upper end and a lower end and a laterally extending side projection, the side projection having a cylindrical configuration with a tapered screw-threaded tip for mounting into a tree trunk by screwing the threaded tip into a tree trunk, each end of the central cylinder having a cylindrical extension having male threads threadedly couplable with the female threads at the lower end of the shaft.

6. The system as set forth in claim 2 and further including a bow hunter's quiver with a plurality of generally parallel slots each terminating in an enlarged aperture of a size to receive and frictionally support a plurality of shafts.

\* \* \* \* \*